United States Patent
De Laet et al.

(10) Patent No.: US 12,234,908 B2
(45) Date of Patent: Feb. 25, 2025

(54) TRANSPORTATION SAFEGUARD WITH INSTALLATION BEARING

(71) Applicant: ZF FRIEDRICHSHAFEN AG, Friedrichshafen (DE)

(72) Inventors: Wim De Laet, Antwerp (BE); Andries Boonen, Friedrichshafen (DE); Pieter Uytterhoeven, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/552,443

(22) PCT Filed: Jul. 18, 2022

(86) PCT No.: PCT/EP2022/070030
§ 371 (c)(1),
(2) Date: Sep. 26, 2023

(87) PCT Pub. No.: WO2023/020760
PCT Pub. Date: Feb. 23, 2023

(65) Prior Publication Data
US 2024/0369136 A1    Nov. 7, 2024

(30) Foreign Application Priority Data
Aug. 20, 2021  (DE) .............. 10 2021 209 151.2

(51) Int. Cl.
*F16H 57/08* (2006.01)
*F16H 57/00* (2012.01)

(52) U.S. Cl.
CPC ... *F16H 57/082* (2013.01); *F16H 2057/0093* (2013.01)

(58) Field of Classification Search
CPC .............. F16H 2057/0093; F16H 57/082
See application file for complete search history.

(56) References Cited

U.S. PATENT DOCUMENTS

| | | | |
|---|---|---|---|
| 2006/0148612 A1* | 7/2006 | Albers | F03D 15/00 475/331 |
| 2009/0149293 A1* | 6/2009 | Van Bogaert | F03D 15/00 475/348 |
| 2015/0337944 A1* | 11/2015 | Leimann | F16H 57/00 414/800 |

FOREIGN PATENT DOCUMENTS

| | | |
|---|---|---|
| DE | 102013202044 A1 | 8/2014 |
| DE | 102017223356 A1 | 6/2019 |
| DE | 102020107995 A1 | 10/2020 |
| WO | 2021004689 A1 | 1/2021 |

* cited by examiner

*Primary Examiner* — Jacob S. Scott
*Assistant Examiner* — Farhana Pervin
(74) *Attorney, Agent, or Firm* — Leydig, Voit & Mayer, Ltd.

(57) ABSTRACT

A transport lock for fixing a planet carrier during transport in a housing-fixed component, including a first part that is joinable to the housing-fixed component, a second part that is joinable to the planet carrier, and at least one bearing, with which the first part and the second part are rotatably supported in one another.

14 Claims, 1 Drawing Sheet

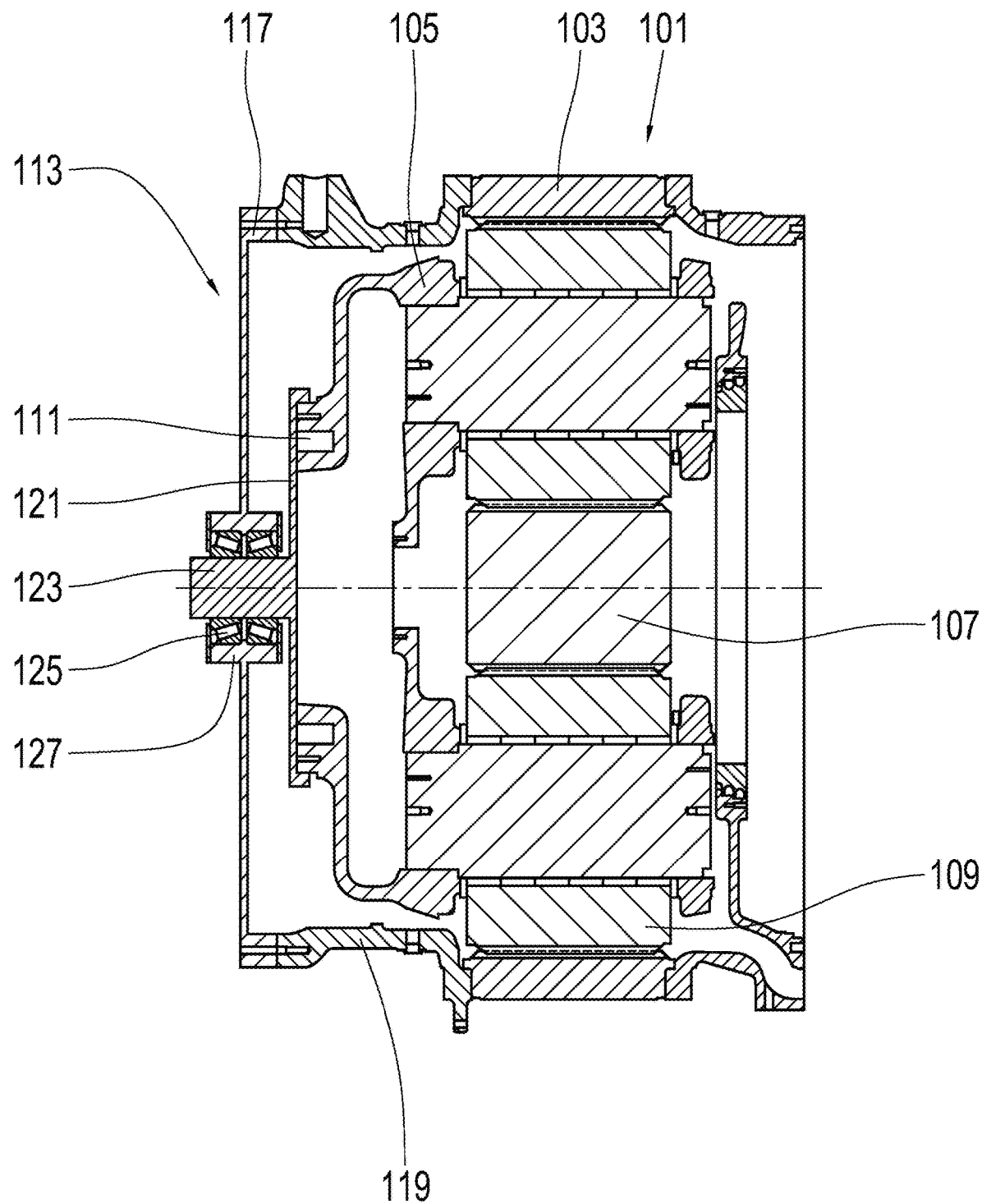

TRANSPORTATION SAFEGUARD WITH INSTALLATION BEARING

CROSS REFERENCE TO RELATED APPLICATIONS

This application is a U.S. National Phase application under 35 U.S.C. § 371 of International Application No. PCT/EP2022/070030, filed on Jul. 18, 2022, and claims benefit to German Patent Application No. DE 10 2021 209 151.2, filed on Aug. 20, 2021. The International Application was published in German on Feb. 23, 2023 as WO 2023/020760 A1 under PCT Article 21 (2).

FIELD

The invention relates to a transport lock, an arrangement with a housing-fixed component and a planet carrier, and a method of disassembling a transport lock of an arrangement.

BACKGROUND

Transport locks for wind turbine gearboxes are known from the prior art. A first-stage planet carrier, which is borne by an input shaft, must be supported during transport due to the absence of the input shaft. The planet carrier is held in a defined position via the transport lock. Conventional transport locks fix the planet carrier rigidly, i.e. without the possibility of a relative movement, in a housing of the gearbox.

SUMMARY

In an embodiment, the present disclosure provides a transport lock for fixing a planet carrier during transport in a housing-fixed component, comprising a first part that is joinable to the housing-fixed component, a second part that is joinable to the planet carrier, and at least one bearing, with which the first part and the second part are rotatably supported in one another.

BRIEF DESCRIPTION OF THE DRAWINGS

Subject matter of the present disclosure will be described in even greater detail below based on the exemplary FIGURE. All features described and/or illustrated herein can be used alone or combined in different combinations. The features and advantages of various embodiments will become apparent by reading the following detailed description with reference to the attached drawings, which illustrate the following:

The FIGURE illustrates a section of a wind power gearbox.

DETAILED DESCRIPTION

In an embodiment, the invention provides an improved transport lock. Preferred embodiments result from the following description.

The means according to an embodiment of the invention is configured to fix a planet carrier in a housing-fixed component during transport. A housing-fixed component is a component that is rigidly fixed relative to a housing, i.e. without the possibility of a relative movement between the component and the housing. In particular, the housing-fixed component may be the housing itself or a portion of the housing. A ring gear of a planetary stage fixed to the housing is also a housing-fixed component. Preferably, said ring gear belongs to the same planetary stage as the planet carrier to be fixed.

The means comprises at least two parts. A first part is configured to be joined to the housing-fixed component. A second part is configured to be joined to the planet carrier. Joining of the two parts results in joints between the respective part and the housing-fixed component and/or the planet carrier. Preferably, the joints are detachable so that the means can be removed for initiating operation. Preferably, the joints are rigid, i.e. without the possibility of a relative movement between the first part of the means and the housing-fixed component and/or between the second part of the means and the planet carrier. Bolted connections, for example, are suitable as joints.

According to an embodiment of the invention, the means comprises at least one bearing. Via the bearing, the first part and the second part are rotatably supported in one another. In particular, the first part and the second part are rotatable relative to each other. This also allows for the planet carrier to be rotated relative to the housing-fixed component and/or relative to the housing when the means is assembled, i.e. when the first part is joined to the housing-fixed component and the second part is joined to the planet carrier.

Due to the twistability of the planet carrier, stationary damage during transport can be avoided. In addition, it is possible to align the angular position of the planet carrier relative to other components. This facilitates assembly and initiating operation. The planet carrier can thus, for example, be twisted relative to a shaft so that it can be bolted to the shaft, such as an input shaft. A twisting of the shaft is then no longer necessary. This is particularly advantageous if a twisting of the shaft is associated with a high level of effort or is completely impossible.

In a preferred embodiment, the second part can be joined with an interface of the planet carrier. The same interface is joinable with the shaft. This implies that the shaft has an interface that is joinable with the interface of the planet carrier. According to an embodiment of the invention, the second part in turn has an interface, which corresponds to the interface of the shaft and which is likewise joinable with the interface of the planet carrier. The embodiment is advantageous if the shaft at least partially bears the planet carrier. During transport, the means then takes the place of the shaft and at least partially bears the planet carrier. This eliminates the need for additional fixing of the planet carrier.

A shaft is a rotatable means. In contrast to an axle, the shaft is configured to transmit a torque that is aligned parallel to an axis of rotation of the shaft.

The first part and/or the second part of the means are preferably configured in one piece. This results in a particularly simple structure of the means.

The planet carrier is preferably rotatable relative to the housing-fixed component and/or the housing. In a preferred embodiment, an axis of rotation of the bearing, with which the first part and the second part of the means are rotatably supported in one another, is identical to an axis of rotation of the planet carrier.

The first part of the means is preferably further configured with a bolt flange. This serves to bolt the first part to the housing-fixed component. The bolt flange of the first part is thereby bolted to the housing-fixed component. This implies that the housing-fixed component has a corresponding bolt flange, to which the bolt flange of the first part is bolted.

Also the second part is preferably further configured with a bolt flange. This serves to bolt the second part to the planet carrier. The bolt flange of the second part is thereby bolted to the planet carrier. For this purpose, the planet carrier must have a corresponding bolt flange, to which the bolt flange of the second part is bolted.

The second part of the means is preferably further configured with an axle. An axle is a rotatably supported component, which, unlike a shaft, does not transmit any torque in the direction of its axis of rotation. The axle of the second part is rotatably supported in a bearing seat of the first part by means of the bearing. The first part is thus, according to the further embodiment, rotatably supported in the first part, more specifically, in its bearing seat via the axle.

Preferably, the first part is further configured with a disk-shaped section. This connects the above-mentioned bolt flange of the first part and the bearing seat to each other. Preferably, the disk-shaped section extends radially outward from the bearing seat in the direction of the bolt flange relative to at least one of the above-mentioned axes of rotation.

The second part is also preferably further configured with a disk-shaped section. This connects the bolt flange of the second part and the above-mentioned axle to each other. Preferably, the disk-shaped section of the second part extends radially outward from the axle relative to at least one of the above-mentioned axes of rotation in the direction of the bolt flange of the second part.

An arrangement according to an embodiment of the invention comprises the above-mentioned housing-fixed component, the above-mentioned planet carrier and the means according to an embodiment of the invention or a preferred further embodiment. The arrangement is preferably a gearbox, such as a wind power gearbox. As described above, the first part of the means is joined to the housing-fixed component. The second part of the means, as also described above, is joined to the planet carrier.

A method according to an embodiment of the invention is used for the disassembly of the means of the arrangement according to an embodiment of the invention. Before performing the steps of the method according to an embodiment of the invention, the first part of the means is joined to the housing-fixed component and the second part of the means is joined to the planet carrier. The method provides that the first part of the means is detached from the housing-fixed component and the second part of the means is detached from the planet carrier. According to an embodiment of the invention, the joints between the first part of the means and the housing-fixed component and between the second part of the means and the planet carrier are thus detached. After the two parts of the means have been detached, the means can be removed in order to initiate operation of the arrangement according to an embodiment of the invention.

A preferred embodiment of the method provides that the first part and the second part of the means are twisted relative to each other. This is preferably performed while the planet carrier is secured with the means in the housing-fixed component, i.e. while the first part of the means is joined to the housing-fixed component and the second part of the means is joined to the planet carrier. This means that the first part and the second part are twisted relative to each other before the detaching steps according to an embodiment of the invention are performed. The twisting of the two parts of the means before performing the detaching steps according to an embodiment of the invention is accompanied by a twisting of the planet carrier relative to the housing-fixed component. The means thereby absorbs at least part of the weight of the planet carrier. Such a twisting allows the planet carrier to be positioned appropriately, for example, in order to enable performance of the further steps for initiating operation of the arrangement.

A preferred embodiment of the method relates to an arrangement, in which the planet carrier is further configured with an interface. The second part of the means is joinable with the interface of the planet carrier, as described at the beginning. Furthermore, a shaft is provided, which is joinable with the interface of the planet carrier, as described at the beginning. According to the embodiment, the second part of the means is detached from the interface of the planet carrier before the interface is joined with the shaft. Preferably, the planet carrier is thereby twisted such that its interface is joinable with the shaft. Preferably, this is performed before the second part is detached from the interface of the planet carrier and before the first part is detached from the housing-fixed component, so that the planet carrier is twisted with the second part in the first part and the housing-fixed component.

By opposite execution of the method according to an embodiment of the invention or a preferred embodiment, the means can be assembled. At the beginning of the execution of such method, the first part and the second part of the means are not joined to the arrangement or to parts thereof. The method provides that the first part of the means is joined to the housing-fixed component and the second part of the means is joined to the planet carrier. According to this, the means allows the housing-fixed component and the planet carrier to be twisted relative to each other, for example to prevent stationary damage. A twisting of the first part and the second part relative to each other is not necessary to be able to assemble the means. Instead, the first part and the second part of the means can be suitably twisted relative to each other before assembly.

The wind power gearbox has a planetary stage 101 arranged on the input side. The planetary stage 101 includes a ring gear 103 fixed to the housing, a rotatably supported planet carrier 105 and a rotatably supported sun gear 107. In the planet carrier 105 planet gears 109 are rotatably supported, each of which mesh with the ring gear 103 and the sun gear 107.

The planet carrier 105 forms a bolt flange 111. This bolt flange serves to connect the planet carrier 105 to an input shaft in a rotatably fixed manner. The planet carrier 105 has no bearing of its own and is instead supported by the input shaft. Since the transport of the gearbox is carried out without the input shaft, a transport lock 113 is required.

A first part 117 of the transport lock 113 is bolted to a housing 119 of the gearbox. A second part 121 is bolted to the flange 111 of the planet carrier 105. The second part 121 has an axle 123 that is rotatably supported via a bearing 125 in a bearing seat 127 formed by the first part 117.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

- 101 planetary stage
- 103 ring gear
- 105 planet carrier
- 107 sun gear
- 109 planet gear
- 111 bolt flange
- 113 transport lock
- 117 first part of the transport lock
- 119 housing
- 121 second part of the transport lock
- 123 axle
- 125 bearing
- 127 bearing seat

The invention claimed is:

1. A transport lock for fixing a planet carrier during transport in a housing-fixed component, comprising:
   a first part that is joinable to the housing-fixed component;
   a second part that is joinable to the planet carrier; and
   at least one bearing, with which the first part and the second part are rotatably supported in one another.

2. The transport lock according to claim 1, wherein the second part is joinable with an interface of the planet carrier.

3. The transport lock according to claim 1, wherein the first part and/or the second part are configured in one piece.

4. The transport lock according to claim 1, wherein an axis of rotation of the at least one bearing and an axis of rotation of the planet carrier are identical.

5. The transport lock according to claim 1, wherein the first part has a bolt flange for being bolted to the housing-fixed component.

6. The transport lock according to claim 1, wherein the second part has a bolt flange for being bolted to the planet carrier.

7. The transport lock according to claim 1, wherein an axle of the second part is rotatably supported in a bearing seat of the first part by the at least one bearing.

8. The transport lock according to claim 7, wherein the first part has a bolt flange for being bolted to the housing-fixed component, and wherein the first part has a disk-shaped section connecting the bolt flange and the bearing seat of the first part to each other.

9. The transport lock according to claim 7, wherein the second part has a bolt flange for being bolted to the planet carrier, and wherein the second part has a disk-shaped section connecting the bolt flange and the axle of the second part to each other.

10. The transport lock according to claim 8, wherein the second part has a bolt flange for being bolted to the planet carrier and wherein the second part has a disk-shaped section connecting the bolt flange and the axle of the second part to each other.

11. An arrangement comprising:
    a housing-fixed component;
    a planet carrier; and
    the transport lock according to claim 1,
    wherein the first part of the transport lock is joined to the housing-fixed component and the second part of the transport lock is joined to the planet carrier.

12. A method of disassembling the transport lock of the arrangement according to claim 11, the method comprising:
    detaching the first part of the transport lock from the housing-fixed component; and
    detaching the second part of the transport lock from the planet carrier.

13. The method according to claim 12 comprising twisting the first part and the second part relative to each other.

14. The method according to claim 12, wherein the second part of the transport lock is joinable with an interface of the planet carrier, the method further comprising detaching the second part from the interface.

* * * * *